United States Patent
Herklots et al.

(10) Patent No.: US 10,072,139 B2
(45) Date of Patent: *Sep. 11, 2018

(54) PROCESS FOR THE PREPARATION OF A COMPOSITION COMPRISING HETEROPHASIC PROPYLENE CO-POLYMER AND TALC

(71) Applicant: SAUDI BASIC INDUSTRIES CORPORATION, Riyadh (SA)

(72) Inventors: Marc Herklots, Geleen (NL); Sarah van Mierloo, Geleen (NL)

(73) Assignee: SAUDI BASIC INDUSTRIES CORPORATION, Riyadh (SA)

(*) Notice: Subject to any disclaimer, the term of this patent is extended or adjusted under 35 U.S.C. 154(b) by 225 days.

This patent is subject to a terminal disclaimer.

(21) Appl. No.: 14/429,207

(22) PCT Filed: Sep. 17, 2013

(86) PCT No.: PCT/EP2013/069296
§ 371 (c)(1),
(2) Date: Mar. 18, 2015

(87) PCT Pub. No.: WO2014/044683
PCT Pub. Date: Mar. 27, 2014

(65) Prior Publication Data
US 2015/0232643 A1    Aug. 20, 2015

(30) Foreign Application Priority Data

Sep. 19, 2012 (EP) .................................... 12006582
Sep. 19, 2012 (EP) .................................... 12006583

(51) Int. Cl.
| | |
|---|---|
| *C08L 23/10* | (2006.01) |
| *C08L 23/08* | (2006.01) |
| *C08K 3/105* | (2018.01) |
| *C08K 9/04* | (2006.01) |
| *C08K 5/52* | (2006.01) |
| *C08L 23/12* | (2006.01) |
| *C08L 23/14* | (2006.01) |
| *C08K 5/524* | (2006.01) |

(52) U.S. Cl.
CPC ............ *C08L 23/10* (2013.01); *C08K 5/52* (2013.01); *C08K 9/04* (2013.01); *C08L 23/12* (2013.01); *C08L 23/14* (2013.01); *C08K 5/524* (2013.01); *C08L 23/0807* (2013.01)

(58) Field of Classification Search
CPC .. C08L 23/08; C08L 23/0807; C08L 23/0815; C08L 23/10; C08L 23/12; C08L 23/14; C08L 23/142
See application file for complete search history.

(56) References Cited

U.S. PATENT DOCUMENTS

| | | |
|---|---|---|
| 3,330,859 A | 7/1967 | Dexter et al. |
| 3,960,928 A | 6/1976 | Mauz |
| 4,399,054 A | 8/1983 | Ferraris et al. |
| 4,472,524 A | 9/1984 | Albizzati |
| 5,777,020 A | 7/1998 | Nagai et al. |
| 6,911,497 B2 | 6/2005 | Satoh et al. |
| 8,003,725 B2 | 8/2011 | Chapman et al. |
| 2003/0114579 A1 | 6/2003 | Mori et al. |
| 2005/0277742 A1 | 12/2005 | Roegiers |
| 2009/0304968 A1 | 12/2009 | De Palo et al. |
| 2009/0305069 A1* | 12/2009 | Goeldel .................. C08L 23/10 428/516 |

(Continued)

FOREIGN PATENT DOCUMENTS

| | | |
|---|---|---|
| EP | 0566141 A2 | 10/1993 |
| EP | 1002814 A1 | 5/2000 |

(Continued)

OTHER PUBLICATIONS

Final Office Action; U.S. Appl. No. 14/428,992, filed Mar. 18, 2015; dated Mar. 29, 2016; 12 Pages.

(Continued)

*Primary Examiner* — Marc S Zimmer
(74) *Attorney, Agent, or Firm* — Cantor Colburn LLP

(57) ABSTRACT

The invention relates to a Process for the preparation of a composition comprising (A) a heterophasic propylene copolymer, (B) talc and (C) a phenolic antioxidant and/or a processing stabilizer, wherein the heterophasic propylene copolymer consists of (a) a propylene-based matrix, wherein the propylene-based matrix consists of a propylene homopolymer and/or a propylene-α-olefin copolymer consisting of at least 70 wt % of propylene and up to 30 wt % of ethylene, based on the total weight of the propylene-based matrix, wherein the propylene-based matrix is present in an amount of 60 to 95 wt % based on the total heterophasic propylene copolymer and (b) a dispersed ethylene-α-olefin copolymer, wherein the dispersed ethylene-α-olefin copolymer is present in an amount of 40 to 5 wt % based on the total heterophasic propylene copolymer and wherein the sum of the total amount of propylene-based matrix and total amount of the dispersed ethylene-α-olefin copolymer in the heterophasic propylene copolymer is 100 wt %, wherein at least part of the talc is surface-modified and wherein the amount of talc in the composition is from about 0.5 to at most 5 wt % based on the heterophasic propylene copolymer, comprising the step of melt-mixing component (A), component (B) and component (C).

13 Claims, No Drawings

(56) References Cited

U.S. PATENT DOCUMENTS

| | | | |
|---|---|---|---|
| 2010/0069557 A1* | 3/2010 | Moad | B29C 47/0004 |
| | | | 524/451 |
| 2010/0261846 A1 | 10/2010 | Shimano et al. | |
| 2010/0298456 A1 | 11/2010 | Nakajima et al. | |
| 2015/0232652 A1 | 8/2015 | Herklots | |
| 2015/0252180 A1 | 9/2015 | Herklots et al. | |

FOREIGN PATENT DOCUMENTS

| | | |
|---|---|---|
| EP | 1241191 A1 | 9/2002 |
| EP | 1477525 A1 | 11/2004 |
| EP | 1607440 A1 | 12/2005 |
| EP | 1988122 A1 | 11/2008 |
| EP | 2108679 A1 | 10/2009 |
| EP | 2141193 A1 | 1/2010 |
| EP | 2275485 A1 | 1/2011 |
| EP | 2397517 A1 | 12/2011 |
| JP | H1045971 A | 2/1998 |
| WO | 0181074 A1 | 1/2001 |
| WO | 2005123827 A1 | 12/2005 |
| WO | 2006010414 A1 | 2/2006 |
| WO | 2009129873 A1 | 10/2009 |
| WO | 2010149546 A1 | 12/2010 |
| WO | 2011023594 A1 | 3/2011 |

OTHER PUBLICATIONS

Handbook of Fillers, 4th Edition authored by George Wypych Chem Tec Publishing 2016 front matter.

Handbook of Fillers, 4th Edition authored by George Wypych Chem Tec Publishing 2016, p. 379-392.

International Search Report for International Application No. PCT/EP2013/069292; International Filing Date: Sep. 17, 2013; dated Nov. 5, 2013; 9 Pages.

International Search Report for International Application No. PCT/EP2013/069295; International Filing Date: Sep. 17, 2013; dated Oct. 31, 2013; 4 Pages.

Non-Final Office Action; U.S. Appl. No. 14/428,992; Date of Filing: Mar. 18, 2015; dated Dec. 16, 2015; 17 Pages.

Non-Final Office Action; U.S. Appl. No. 14/429,217; Date of Filing: Mar. 18, 2015; dated Dec. 7, 2015; 19 Pages.

Non-Final Office Action; U.S. Appl. No. 14/429,217; Date of Filing: Mar. 18, 2015; dated May 6, 2016; 29 Pages.

Written Opinion of the International Searching Authority for International Application No. PCT/EP2013/069292; International Filing Date: Sep. 17, 2013; dated Nov. 5, 2013; 5 Pages.

Written Opinion of the International Searching Authority for International Application No. PCT/EP2013/069295; International Filing Date: Sep. 17, 2013; dated Oct. 31, 2013; 5 Pages.

International Search Report for International Application No. PCT/EP2013/069296; International Filing Date: Sep. 17, 2013; dated Dec. 13, 2013; 4 Pages.

Reingruber et al., "Identification of Degradation Products of Antioxidants in Polyolefins by Liquid Chromatography Combined with Atmospheric Pressure PHotoionisation Mass Spectrometry," Polymer Degradation and Stability 95 (2010) pp. 740-745.

Ser van der Ven, "Polypropylene and other Polyolefins: Polymerization and Characterization," Studies in Polymer Science 7, Elsevier (1990), pp. 1-11.

Written Opinion of the International Searching Authority for International Application No. PCT/EP2013/069296; International Filing Date: Sep. 17, 2013; dated Dec. 13, 2013; 5 Pages.

Communication of a Notice of Opposition from European Patent Office for Appln. No. 13762852.5; dated Nov. 15, 2017; Date Received: Dec. 5, 2017; 31 Pages.

Communication of a Notice of Opposition from European Patent Office for Appln. No. 13765992.6; dated Nov. 20, 2017; Date Received: Dec. 5, 2017; 36 Pages.

Machine Translation of JPH1045971(A); Date of Publication: Feb. 17, 1998; 20 Pages.

Communication of a Notice of Opposition from European Patent Office for Appln. No. 13763069.5; dated Aug. 30, 2017; Date Received: Sep. 5, 2017; 52 Pages.

* cited by examiner

PROCESS FOR THE PREPARATION OF A COMPOSITION COMPRISING HETEROPHASIC PROPYLENE CO-POLYMER AND TALC

CROSS REFERENCE TO RELATED APPLICATIONS

This application is a 371 of International Application No. PCT/EP2013/069296, filed Sep. 17, 2013 which claims priority to European Application Nos. 12006582.6, filed Sep. 19, 2012 and 12006583.4, filed Sep. 19, 2012 which are hereby incorporated by reference in their entirety.

The invention relates to a process for the preparation of a composition comprising a heterophasic propylene copolymer and talc, a composition obtained or obtainable by said process and to the use of said composition.

Heterophasic propylene copolymer, also known as impact propylene copolymers or propylene block copolymers, are an important class of polymers due to their attractive combination of mechanical properties, such as impact strength over a wide temperature range and their low cost. These copolymers find a wide range of applications ranging from the consumer industry (for example packaging and housewares), the automotive industry to electrical applications.

To increase the stiffness of the heterophasic propylene copolymer, talc may be added as a filler. However, it is known that the thermooxidative stability decreases by the addition of talc. Mainly interactions between the stabilizer (such as an antioxidant) and talc and adsorption/desorption mechanisms are responsible for this effect. When the stiffness of the heterophasic propylene copolymer is increased by talc, more amount of stabilizer is needed in order to obtain the same stability of a heterophasic propylene copolymer as compared to when talc is not present in the heterophasic propylene copolymer. The use of high amounts of stabilizer leads to high amounts of stabilizer degradation products and impurities in the final polymer. These stabilizer degradation products may be released during the life-time of the heterophasic propylene copolymer composition, which is undesired, as they may cause unpleasant odours and may affect organoleptic properties. Also, high amounts of stabilizer degradation products make the heterophasic propylene copolymer unsuitable for food contact applications. Also, the use of high amounts of stabilizers adds to the cost of the heterophasic polypropylene copolymer composition, which is undesired from an economical point of view.

Therefore, it is an object of the invention to provide a heterophasic polypropylene composition that combines a high stiffness with a high thermooxidative stability.

This object is achieved by a process for the preparation of a composition comprising (A) a heterophasic propylene copolymer, (B) talc and (C) a phenolic antioxidant and/or a processing stabilizer, wherein the heterophasic propylene copolymer consists of (a) a propylene-based matrix, wherein the propylene-based matrix consists of a propylene homopolymer and/or a propylene-α-olefin copolymer consisting of at least 70 wt % of propylene and up to 30 wt % of ethylene, based on the total weight of the propylene-based matrix, wherein the propylene-based matrix is present in an amount of 60 to 95 wt % based on the total heterophasic propylene copolymer, and (b) a dispersed ethylene-α-olefin copolymer, wherein the dispersed ethylene-α-olefin copolymer is present in an amount of 40 to 5 wt % based on the total heterophasic propylene copolymer and wherein the sum of the total amount of propylene-based matrix and total amount of the dispersed ethylene-α-olefin copolymer in the heterophasic propylene copolymer is 100 wt %, wherein at least part of the talc is surface-modified and wherein the amount of talc in the composition is from about 0.5 to at most 5 wt % based on the heterophasic propylene copolymer, comprising the step of melt-mixing component (A), component (B) and component (C).

It has been found that with the process of the present invention, a heterophasic polypropylene composition can be prepared that combines the favourable properties of a high stiffness, a good impact strength and a high thermooxidative stability.

The use of the surface-modified talc according to the present invention leads to a higher thermooxidative stability of the heterophasic polypropylene composition compared to the cases where non-surface-modified talc is used. The use of the surface-modified talc according to the present invention further leads to a comparable thermooxidative stability as the cases where no talc is added, while obtaining improved mechanical properties due to the presence of talc.

Furthermore, the process of the invention is an easy and cost-effective process. It was found that satisfactory mechanical properties are obtained at a relatively small amount of the surface-modified talc of about 0.5 to 5 wt %. A higher amount of the surface-modified talc may cause a negative effect on the stability although less severe than a non-modified talc, and the relatively small amount of the surface-modified talc used according to the invention ensures that a high stability is maintained.

Further, the small amount of talc used in the process of the invention allows the talc to be added in line, i.e. in the extruder directly after the reactor and not off-line in a separate compounding step, which would be needed for larger amounts of talc.

It is also noted that a higher amount of (surface-modified) talc is used typically for preparing a composition for use in automotive applications, whereas the relatively low amount of 0.5 to 5 wt % of the (surface-modified) talc is used in extrusion applications such as a pipe or a sheet, or injection moulding applications such as suitcases, containers, crates and boxes and power tool cases.

The use of the surface-modified talc according to the present invention allows a lower amount of phenolic antioxidants to be used for obtaining a desired thermooxidative stability, which in turn leads to a lower amount of the degradation products of the phenolic antioxidants. This is favourable for organoleptic performance of the composition according to the invention and lower emission levels.

For purpose of the present invention, stiffness is determined by measuring the flexural modulus according to ASTM D790-10.

For purpose of the present invention, impact strength is determined by measuring the Izod impact strength at 23° C. according to ISO 180 4A.

For purpose of the present invention, flow is determined by measuring the melt flow rate, also called melt flow index or melt index according to ISO1133 (2.16 kg/230° C.).

Heterophasic propylene copolymers are generally prepared in one or more reactors, by polymerization of propylene in the presence of a catalyst and subsequent polymerization of a propylene-α-olefin mixture. The resulting polymeric materials are heterophasic, but the specific morphology usually depends on the preparation method and monomer ratios used.

The heterophasic propylene copolymers employed in the process according to present invention can be produced using any conventional technique known to the skilled person, for example multistage process polymerization, such as bulk polymerization, gas phase polymerization, slurry polymerization, solution polymerization or any combinations thereof. Any conventional catalyst systems, for example, Ziegler-Natta or metallocene may be used. Such techniques and catalysts are described, for example, in WO06/010414; *Polypropylene and other Polyolefins*, by Ser van der Ven, Studies in Polymer Science 7, Elsevier 1990; WO06/010414, U.S. Pat. No. 4,399,054 and U.S. Pat. No. 4,472,524.

The heterophasic propylene copolymer of the composition of the invention consists of a propylene-based matrix and a dispersed ethylene-α-olefin copolymer. The propylene-based matrix typically forms the continuous phase in the heterophasic propylene copolymer.

The propylene-based matrix consists of a propylene homopolymer and/or a propylene-α-olefin copolymer consisting of at least 70 wt % of propylene and up to 30 wt % of α-olefin, for example ethylene, for example consisting of at least 80 wt % of propylene and up to 20 wt % of α-olefin, for example consisting of at least 90 wt % of propylene and up to 10 wt % of α-olefin, based on the total weight of the propylene-based matrix.

Preferably, the α-olefin in the propylene-α-olefin copolymer is selected from the group of α-olefins having 2 or 4-10 carbon atoms and is preferably ethylene.

Preferably, the propylene-based matrix consists of a propylene homopolymer.

The melt flow index (MFI) of the propylene-based matrix (before it is mixed into the composition of the invention) may be in the range of for example 0.3 to 200 dg/min, for example from 0.3 to 80 dg/min measured according to ISO1133 (2.16 kg/230° C.), for example in the range from 3 to 70, for example in the range from 10 to 60 dg/min, for example in the range from 15 to 40 dg/min.

The propylene-based matrix is present in an amount of 60 to 95 wt %, for example 65 to 85 wt %, for example 70 to 85 wt %, for example 70 to 80 wt %, for example 65 to 75 wt % or 75 to 85 wt % based on the total heterophasic propylene copolymer.

The propylene-based matrix is preferably semi-crystalline, that is it is not 100% amorphous, nor is it 100% crystalline. For example, the propylene-based matrix is at least 40% crystalline, for example at least 50%, for example at least 60% crystalline and/or for example at most 80% crystalline, for example at most 70% crystalline. For example, the propylene-based matrix has a crystallinity of 60 to 70%. For purpose of the invention, the degree of crystallinity of the propylene-based matrix is measured using differential scanning calorimetry according to ISO11357-1 and ISO11357-3 of 1997, using a scan rate of 10° C./min, a sample of 5 mg and the second heating curve using as a theoretical standard for a 100% crystalline material 207.1 J/g.

Besides the propylene-based matrix, the heterophasic propylene copolymer also consists of a dispersed ethylene-α-olefin copolymer. The dispersed ethylene-α-olefin copolymer is also referred to herein as the 'dispersed phase'. The dispersed phase is embedded in the heterophasic propylene copolymer in a discontinuous form. The particle size of the dispersed phase is typically in the range of 0.5 to 10 microns, as may be determined by transmission electron microscopy (TEM).

The MFI of the dispersed ethylene α-olefin copolymer (before it is mixed into the composition of the invention) may for example be in the range from 0.001 to 10 dg/min (measured according to ISO1133 (2.16 kg/230° C.)), preferably in the range from 0.006 to 5 dg/min.

The dispersed ethylene-α-olefin copolymer is present in an amount of 40 to 5 wt %, for example in an amount of 35 to 15 wt % based on the total heterophasic propylene copolymer, for example in an amount of at least 20 wt % and/or for example in an amount of at most 30 wt % based on the total heterophasic propylene copolymer.

Preferably, the amount of ethylene in the ethylene-α-olefin copolymer is in the range of 20-65 wt %, for example in the range of 40 to 60 wt % based on the ethylene-α-olefin copolymer, for example the amount of ethylene in the ethylene-α-olefin copolymer is at least 30 wt % and/or for example at most 55 wt % based on the ethylene-α-olefin copolymer.

In the heterophasic polypropylene in the composition of the invention, the sum of the total weight of the propylene-based matrix and the total weight of the dispersed ethylene-α-olefin copolymer is 100 wt %

The α-olefin in the ethylene-α-olefin copolymer is preferably chosen from the group of α-olefins having 3 to 8 carbon atoms and any mixtures thereof, preferably the α-olefin in the ethylene-α-olefin copolymer is chosen from the group of α-olefins having 3 to 4 carbon atoms and any mixture thereof, more preferably the α-olefin is propylene, in which case the ethylene-α-olefin copolymer is ethylene-propylene copolymer. Examples of suitable α-olefins having 3 to 8 carbon atoms, which may be employed as ethylene comonomers to form the ethylene α-olefin copolymer include but are not limited to propylene, 1-butene, 1-pentene, 4-methyl-1-pentene, 1-hexen, 1-heptene and 1-octene.

The process of the invention comprises the step of melt-mixing component (A), component (B) and component (C).

With melt-mixing is meant that the talc and the phenolic antioxidant and/or the processing stabilizer are mixed with the heterophasic propylene copolymer at a temperature that exceeds the melting point of the heterophasic propylene copolymer. Melt-mixing may be done using techniques known to the skilled person, for example in an extruder. Generally, in the process of the invention, melt-mixing is performed at a temperature in the range from 200-300° C.

Suitable conditions for melt-mixing, such as temperature, pressure, amount of shear, screw speed and screw design when an extruder is used are known to the skilled person.

When using an extruder, a conventional extruder such as a twin-screw extruder may be used. The temperature can vary through the different zones of the extruder as required. For example, the temperature may vary from 180° C. in the feed zone to 300° C. at the die. Preferably, the temperature in the extruder varies from 200 to 265° C.; lower temperatures may lead to a decreased processability; too high temperatures may induce undesired degradation processes, which may for example result in compositions having poor mechanical properties. Likewise, the screw speed of the extruder may be varied as needed. Typical screw speed are in the range from about 100 rpm to about 400 rpm.

The residence time in the extruder for the heterophasic propylene copolymer may be lower than 1 minute, for example between 10 and 40 seconds.

Talc is a relatively abundant, inexpensive, highly hydrophobic and generally unreactive mineral. It can be categorized as a hydrated magnesium silicate and its main components can be represented by, inter alia, one or more of the formulas $(Si_2O_5)_2Mg_3(OH)_2$, $Si_8Mg_6O_{20}(OH)_4$ or $Mg_{12}Si_{16}O_{40}(OH)_8$. Talcs suitable for use as additives to a heterophasic propylene copolymer are commercially available from for example Imerys Luzenac. 'Talc' and 'talcum' are used interchangeably herein.

Talc is available in several particle sizes, for example the particle sizes of talc are classified as 'ultrafine' (average particle size of lower than 1 μm, for example an average particle size in the range of 0.5 to 0.9 1 μm) and 'fine' (average particle size of at least 1 μm, for example an average particle size of 1 μm to 5 μm). Preferably, fine or ultrafine powder particles are used in the process of the present invention.

Other words that are commonly used for surface-modified talc are surface-treated talc or surface coated talc. Surface-modified talc's are known to the person skilled in the art and are commercially available from for example Imerys Luzenac. Surface-modified talcs may be prepared by adding a surface modifier to the talc. The nature and concentration of the modifier depends on the desired benefit in the final talc composite, like improvement of the bond between the talcum and polymer or to improve the dispersion of the talc in the polymer. Examples of surface modifiers are silanes, amines, glycols, stearates, sorbates and titanates.

Preferably, the surface-modified talc is a talc that is surface-modified with a polar substance selected from the group of glycols, silanes and amines.

Depending on the desired stiffness, the amount of talc used may be varied. For practical reasons, the amount of surface-modified talc in the composition of the invention is at most 5 wt % based on the heterophasic propylene copolymer. For example, the amount of surface-modified talc in the composition is at least 1 wt %, for example at least 1.5 wt % and/or for example at most 4 wt %, for example at most 3.5 wt %, for example at most 3 wt % based on the heterophasic propylene copolymer.

In the process of the invention or in the composition of the invention at least part of the talc is surface-modified, that means that mixtures of surface-modified talc with non-surface modified talc may also be used. Preferably, at least 80 wt % of the talc used in the process of the invention or present in the composition of the invention is surface-modified, more preferably at least 90 wt %, even more preferably at least 95 wt %, in particular at least 98 wt %, more in particular at least 99 wt %, most in particular all talc used in the process of the invention or present in the composition of the invention is surface-modified. The higher the wt % of surface-modified talc based on the talc used, the less amount of component (C) is needed to obtain a high thermooxidative stability.

Preferably the phenolic antioxidant, component (C) is a compound of the formula I

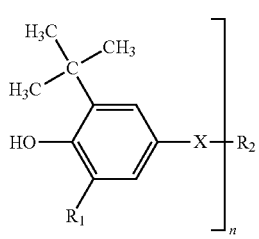

(I)

in which
$R_1$ is $C_1$-$C_4$ alkyl,
n is 1, 2, 3 or 4,
X is methylene,

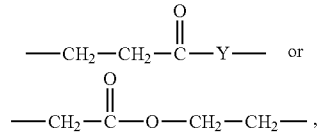

Y is hydrogen or —NH—; and,
if n is 1,
X is

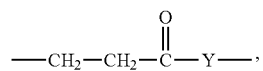

where Y is attached to $R_2$, and
$R_2$ is $C_1$-$C_{25}$ alkyl; and,
if n is 2,
X is

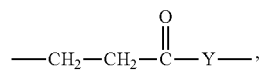

where Y is attached to $R_2$, and
$R_2$ is $C_2$-$C_{12}$ alkylene, $C_4$-$C_{12}$ alkylene interrupted by oxygen or sulfur; or, if Y is —NH—, $R_2$ is additionally a direct bond; and,
if n is 3,
X is methylene or

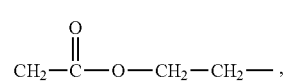

where the ethylene group is attached to $R_2$, and
$R_2$ is

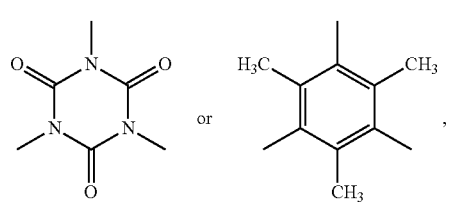

and
if n is 4,
X is

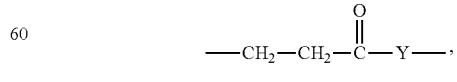

where Y is attached to $R_2$, and
$R_2$ is $C_4$-$C_{10}$ alkanetetrayl.

Alkyl having up to 25 carbon atoms is a branched or unbranched radical, for example methyl, ethyl, propyl, isopropyl, n-butyl, sec-butyl, isobutyl, tert-butyl, 2-ethylbutyl, n-pentyl, isopentyl, 1-methylpentyl, 1,3-dimethylbutyl, n-hexyl, 1-methylhexyl, n-heptyl, isoheptyl, 1,1,3,3-tetramethylbutyl, 1-methylheptyl, 3-methylheptyl, n-octyl, 2-ethylhexyl, 1,1,3-trimethylhexyl, 1,1,3,3-tetramethylpentyl, nonyl, decyl, undecyl, 1-methylundecyl, dodecyl, 1,1,3,3,5,5-hexamethylhexyl, tridecyl, tetradecyl, pentadecyl, hexadecyl, heptadecyl, octadecyl, eicosyl or docosyl. A preferred definition of $R_1$ is methyl and tert-butyl. A particularly preferred definition of $R_2$ is $C_1$-$C_{20}$ alkyl, especially $C_1$-$C_{18}$ alkyl, for example $C_4$-$C_{18}$ alkyl. An especially preferred definition of $R_2$ is $C_8$-$C_{18}$ alkyl, especially $C_{14}$-$C_{18}$ alkyl, for example $C_{18}$ alkyl.

$C_2$-$C_{12}$ alkylene is a branched or unbranched radical, for example ethylene, propylene, tetramethylene, pentamethylene, hexamethylene, heptamethylene, octamethylene, decamethylene or dodecamethylene. A preferred definition of $R_2$ is, for example, $C_2$-$C_{10}$ alkylene, especially $C_2$-$C_8$ alkylene. An especially preferred definition of $R_2$ is, for example, $C_4$-$C_8$ alkylene, especially $C_4$-$C_6$ alkylene, for example hexamethylene.

$C_4$-$C_{12}$ alkylene interrupted by oxygen or sulfur can be interrupted one or more times and is, for example, —CH$_2$—O—CH$_2$CH$_2$—O—CH$_2$—, —CH$_2$—(O—CH$_2$CH$_2$—)$_2$O—CH$_2$—, —CH$_2$—(O—CH$_2$CH$_2$—)$_3$O—CH$_2$—, —CH$_2$—(O—CH$_2$CH$_2$—)$_4$O—CH$_2$—, —CH$_2$CH$_2$—O—CH$_2$CH$_2$—O—CH$_2$CH$_2$— or —CH$_2$CH$_2$—S—CH$_2$CH$_2$—. A preferred definition of $R_2$ is, for example, $C_4$-$C_{10}$ alkylene interrupted by oxygen or sulfur, especially $C_4$-$C_8$ alkylene interrupted by oxygen or sulfur, for example $C_4$-$C_6$ alkylene interrupted by oxygen or sulfur. An especially preferred meaning of $R_2$ is —CH$_2$CH$_2$—O—CH$_2$CH$_2$—O—CH$_2$CH$_2$— or —CH$_2$CH$_2$—S—CH$_2$CH$_2$—.

Alkanetetrayl having 4 to 10 carbon atoms is, for example,

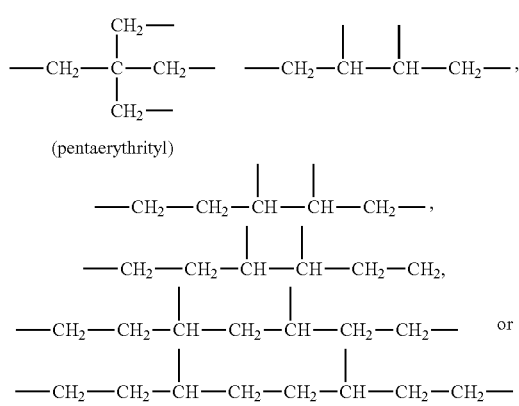

(pentaerythrityl)

Pentaerythrityl is preferred.

Component (C) may also comprise mixtures of different sterically hindered phenols of the formula I.

The compositions of interest include those comprising as component (C) at least one compound of the formula I in which, if n is 1, $R_2$ is $C_1$-$C_{20}$ alkyl.

Preference is given to compositions comprising as component (C) at least one compound of the formula I in which,
if n is 2,
$R_2$ is $C_2$-$C_8$ alkylene, C4-$C_8$ alkylene interrupted by oxygen or sulfur; or, if Y is —NH—, $R_2$ is additionally a direct bond; and,
if n is 3,
X is methylene,
$R_1$ is

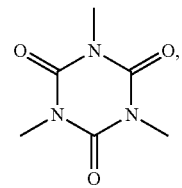

and,
if n is 4,
$R_2$ is $C_4$-$C_8$ alkanetetrayl.

Preference is likewise given to compositions comprising as component (c) at least one compound of the formula I in which
$R_1$ is methyl or tert-butyl, n is 1, 2, 3 or 4,
X is methylene or

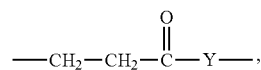

Y is hydrogen or —NH—; and,
if n is 1,
$R_2$ is $C_{14}$-$C_{18}$ alkyl; and
if n is 2,
$R_2$ is $C_4$-$C_6$ alkylene, or is $C_4$-$C_6$ alkylene interrupted by oxygen; and,
if n is 3,
X is methylene,
$R_2$ is

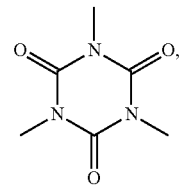

and,
if n is 4,
$R_2$ is $C_4$-$C_6$ alkanetetrayl.

Likewise of interest are compositions comprising as component (C) at least one compound of the formula I in which the compound of the formula I is a compound of the formula Ia to Ii

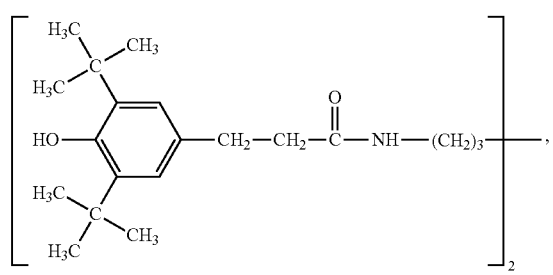

Irganox® 1098

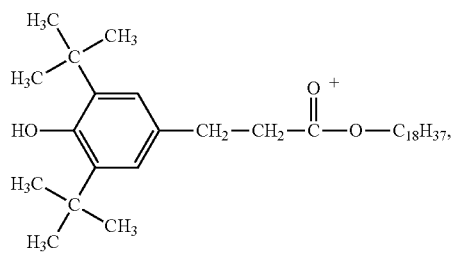
Irganox® 1076  (Ib)
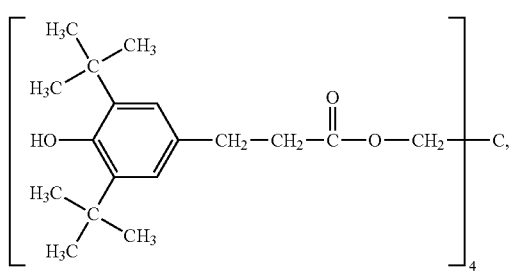
Irganox® 1010  (Ic)
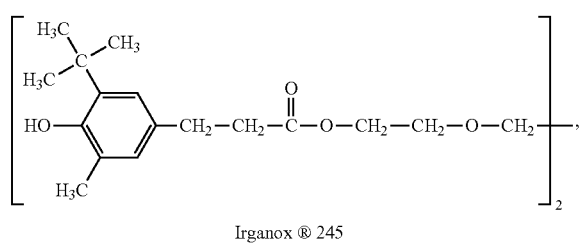
Irganox® 245  (Id)
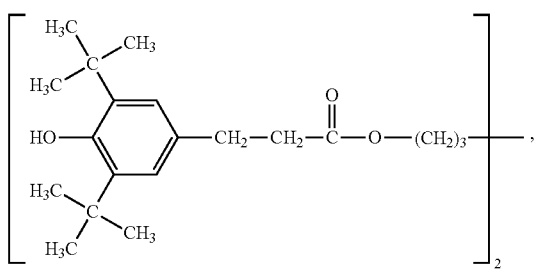
Irganox® 259  (Ie)
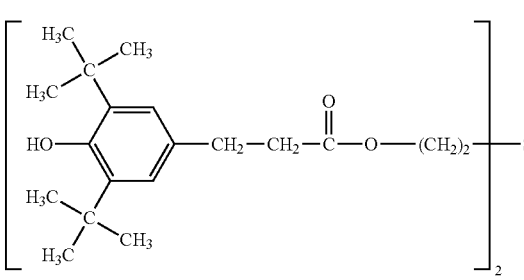
Irganox® 1035  (If)
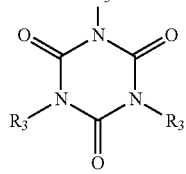
Irganox® 3114  (Ig)
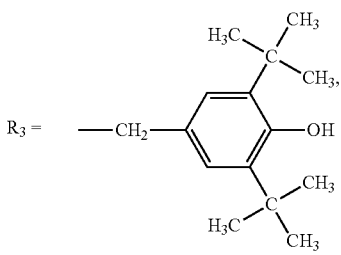
$R_3 =$
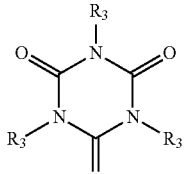
Irganox® 3125  (Ih)
$R_3 =$ 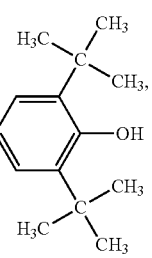
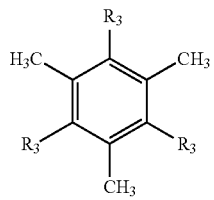
Irganox® 1330  (Ii)
$R_3 =$ 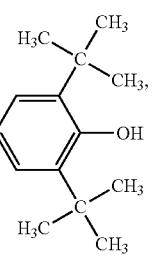
Irganox® 1098, Irganox® 1076, Irganox® 1010, Irganox® 245, Irganox® 259, Irganox® 3114, Irganox® 1035, Irganox® 3125 and Irganox® 1330 are protected trade names of Ciba Inc.
Preference is given as component (C) at least one compound of the formula I in which the compound of the formula I is a compound of the formula Ia, Ib, Ic or Id, in particular a compound of the formula Ia, Ib or Ic.

Component (C) and the compounds of the formula I are known and in some cases obtainable commercially. Possible preparation processes for the compounds of the formula I can be found, for example, in the U.S. Pat. Nos. 3,330,859 or 3,960,928.

Of interest are also compositions comprising as component (C) processing stabilizers selected from the group consisting of organic phosphites or phosphonites.

Of particular interest are compositions comprising as component (C) at least one compound of the group of the organic phosphites or phosphonites of the formulae II to VIII

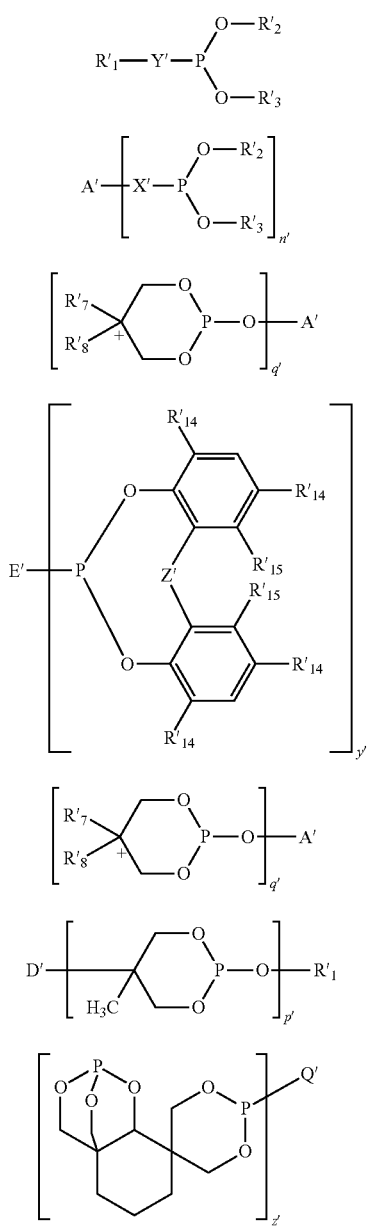

in which the indices are integral and n' is 2, 3 or 4; p' is 1 or 2; q' is 2 or 3; r' is 4 to 12; y' is 1, 2 or 3; and z' is 1 to 6;

A', if n' is 2, is $C_2$-$C_{18}$ alkylene; $C_2$-$C_{12}$ alkylene interrupted by oxygen, sulfur or —NR'$_4$; a radical of the formula

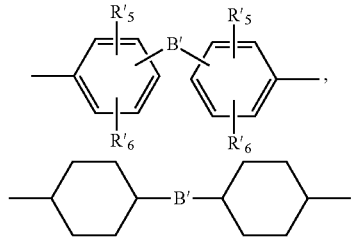

or phenylene;

A', if n' is 3, is a radical of the formula —$C_{r'}H_{2r'-1}$;

A', if n' is 4, is

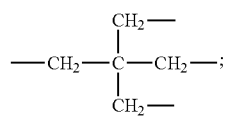

A" has the meaning of A' if n' is 2;

B' is a direct bond, —CH$_2$—, CHR'$_4$—, —CR'$_1$R'$_4$—, sulfur or $C_5$-$C_7$ cycloalkylidene, or cyclohexylidene substituted by from 1 to 4 $C_1$-$C_4$ alkyl radicals in position 3, 4 and/or 5;

D', if p' is 1, is methyl and, if p' is 2, is —CH$_2$OCH$_2$—;

E', if y' is 1, is $C_1$-$C_{18}$ alkyl, —OR'$_1$ or halogen;

E', if y is 2, is —O-A"-O—,

E', if y is 3, is a radical of the formula R'$_4$C(CH$_2$O—)$_3$ or N(CH$_2$CH$_2$O—)$_3$;

Q' is the radical of an at least z'-valent alcohol or phenol, this radical being attached via the oxygen atom to the phosphorus atom;

R'$_1$, R'$_2$ and R'$_3$ independently of one other are unsubstituted or halogen, —COOR$_4$'. —CN— or —CONR$_4$'R$_4$'-substituted $C_1$-$C_{18}$ alkyl; $C_2$-$C_{18}$ alkyl interrupted by oxygen, sulfur or —NR'$_4$—; $C_7$-$C_9$ phenylalkyl; $C_5$-$C_{12}$ cycloalkyl, phenyl or naphthyl; naphthyl or phenyl substituted by halogen, 1 to 3 alkyl radicals or alkoxy radicals having in total 1 to 18 carbon atoms or by $C_7$-$C_9$phenylalkyl; or are a radical of the formula

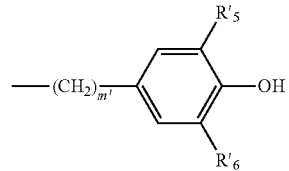

in which m' is an integer from the range 3 to 6;

R'$_4$ is hydrogen, $C_1$-$C_{18}$ alkyl, $C_5$-$C_{12}$ cycloalkyl or $C_7$-$C_9$ phenylalkyl, R'$_5$ and R'$_6$ independently of one another are hydrogen, $C_1$-$C_8$ alkyl or $C_5$-$C_6$ cycloalkyl, R'$_7$ and R'$_8$, if q' is 2, independently of one another are $C_1$-$C_4$ alkyl or together are a 2,3-dehydropentamethylene radical; and R'$_7$ and R'$_8$, if q' is 3, are methyl;

R'$_{14}$ is hydrogen, $C_1$-$C_9$ alkyl or cyclohexyl,

R'$_{15}$ is hydrogen or methyl and, if two or more radicals R'$_{14}$ and R'$_{15}$ are present, these radicals are identical or different, X' and Y' are each a direct bond or oxygen, Z' is a direct bond, methylene, —C(R'$_{16}$)$_2$— or sulfur, and
R'$_{16}$ is C$_1$-C$_8$ alkyl.
Preferably the processing stabilizer, component (C) is a compound of the formula II, III, IV or V

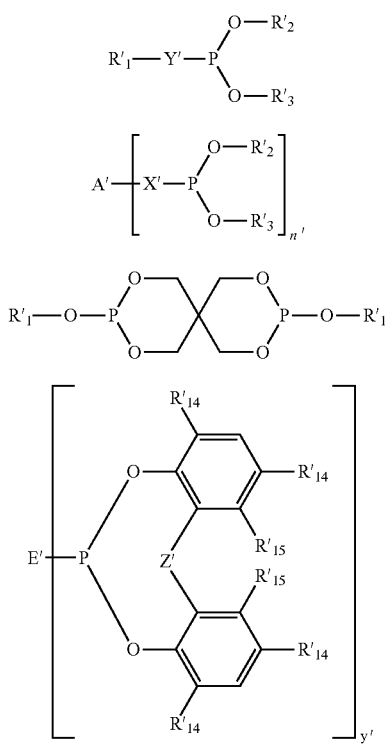

in which n' is the number 2 and y' is the number 1, 2 or 3;
A' is C$_2$-C$_{18}$ alkylene, p-phenylene or p-biphenylene,
E', if y' is 1, is C$_1$-C$_{18}$alkyl, —OR'$_1$ or fluorine;
E', if y' is 2, is p-biphenylene,
E' if y' is 3, is N(CH$_2$CH$_2$O—)$_3$,
R'$_1$, R'$_2$ and R'$_3$ independently of one another are C$_1$-C$_{18}$ alkyl, C$_7$-C$_9$phenylalkyl, cyclohexyl, phenyl, or phenyl substituted by 1 to 3 alkyl radicals having in total 1 to 18 carbon atoms;
R'$_{14}$ is hydrogen or C$_1$-C$_9$ alkyl,
R'$_{15}$ is hydrogen or methyl;
X' is a direct bond,
Y' is oxygen,
Z' is a direct bond or —CH(R'$_{16}$)—, and
R'$_{16}$ is C$_1$-C$_4$alkyl.
Particular preference is given as component (C) a phosphite or phosphonite of the formula II, III or V.
Special preference is given as component (C) at least one compound of the formula VII

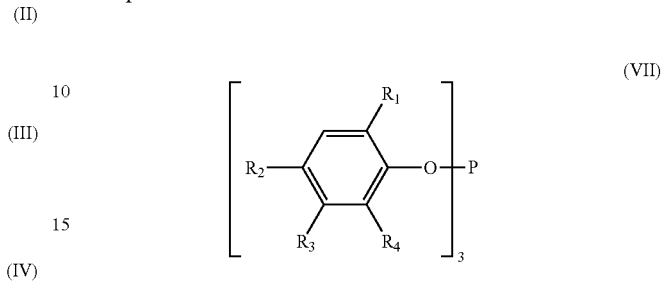

in which
R$_1$ and R$_2$ independently of one another are hydrogen, C$_1$-C$_8$ alkyl, cyclohexyl or phenyl, and
R$_3$ and R$_4$ independently of one another are hydrogen or C$_1$-C$_4$ alkyl.
The following compounds are examples of organic phosphites and phosphonites which are particularly suitable as component (C) in the compositions.

Triphenyl phosphite, diphenyl alkyl phosphites, phenyl dialkyl phosphites, tris(nonylphenyl) phosphite, trilauryl phosphite, trioctadecyl phosphite, distearyl pentaerythritol diphosphite, tris(2,4-di-tert-butylphenyl) phosphite (Irgafos® 168, Ciba Specialty Chemicals Inc.), diisodecyl pentaerythritol diphosphite, bis(2,4-di-tert-butylphenyl) pentaerythritol diphosphite (formula D1), bis(2,6-di-tert-butyl-4-methylphenyl) pentaerythritol diphosphite (formula E1), bisisodecyloxy-pentaerythritol diphosphite, bis(2,4-di-tert-butyl-6-methylphenyl) pentaerythritol diphosphite, bis(2,4,6-tri-tert-butylphenyl) pentaerythritol diphosphite, tristearyl sorbitol triphosphite, tetrakis(2,4-di-tert-butylphenyl) 4,4'-biphenylenediphosphonite (Irgafos®P-EPQ, Ciba Specialty Chemicals Inc., formula H1), 6-isooctyloxy-2,4,8,10-tetra-tert-butyl-12H-dibenzo[d,g]-1,3,2-dioxaphosphocin (formula C1), 6-fluoro-2,4,8,10-tetra-tert-butyl-12-methyl-dibenzo[d,g]-1,3,2-dioxaphosphocin (formula A1), bis(2,4-di-tert-butyl-6-methylphenyl) methyl phosphite, bis(2,4-di-tert-butyl-6-methylphenyl) ethyl phosphite (formula G1).

Particular preference is given to the use of the following phosphites and phosphonites: tris(2,4-di-tert-butylphenyl) phosphite (Irgafos®168, Ciba Specialty Chemicals Inc.), tris(nonylphenyl) phosphite,

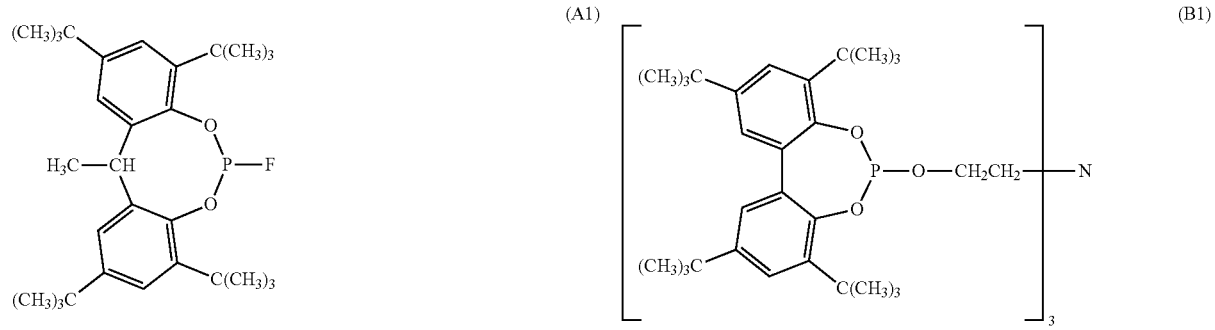

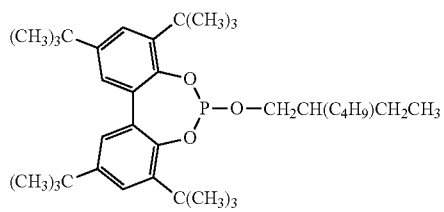 (C1)

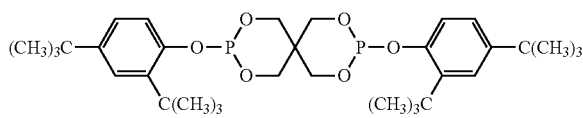 (D1)

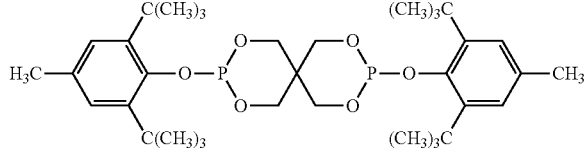 (E1)

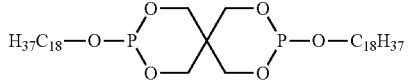 (F1)

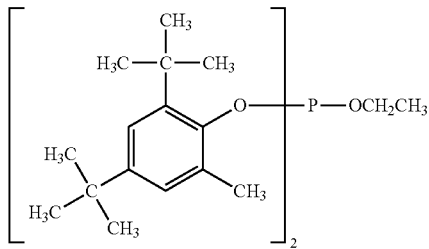 (G1)

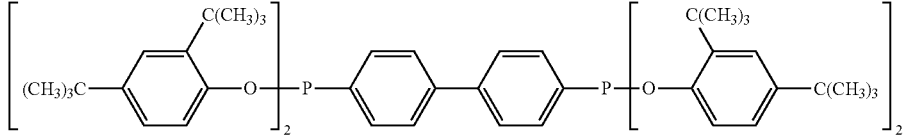 (H1)

Very particular preference is given to tris(2,4-di-tert-butylphenyl) phosphite [Irga-fos® 168, Ciba Inc.], bis(2,4-di-tert-butyl-6-methylphenyl) ethyl phosphite [Irgafos® 38, Ciba Inc., formula (G1)], bis(2,4-di-tert-butylphenyl) pentaerythritol diphosphite [Irgafos® 126, Ciba Inc., formula (D1)] or tetrakis(2,4-di-tert-butylphenyl)-4,4'-biphenylenediphosphonite [Irgafos® P-EPQ, Ciba Inc., formula (H1)].

The above mentioned organic phosphites and phosphonites are known compounds; many of them are available commercially.

Of very special interest are compositions wherein component (C) is tris(2,4-di-tert-butylphenyl) phosphite, bis(2,4-di-tert-butyl-6-methylphenyl) ethyl phosphite, bis(2,4-di-tert-butylphenyl) pentaerythritol diphosphite, tetrakis(2,4-di-tert-butylphenyl) 4,4'-biphenylenediphosphonite, and/or a compound of the formula Ia, Ib, Ic, Id or Ig

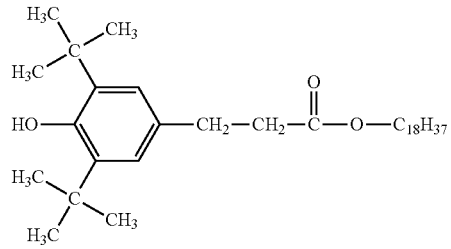 (Ib)

-continued

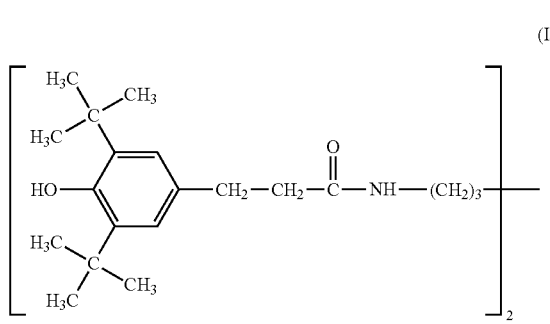 (Ia)

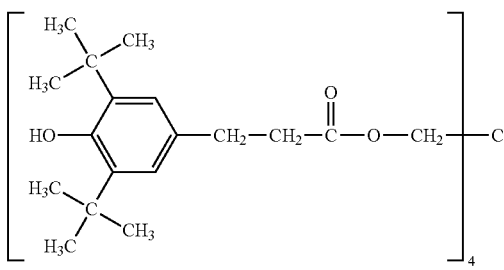 (Ic)

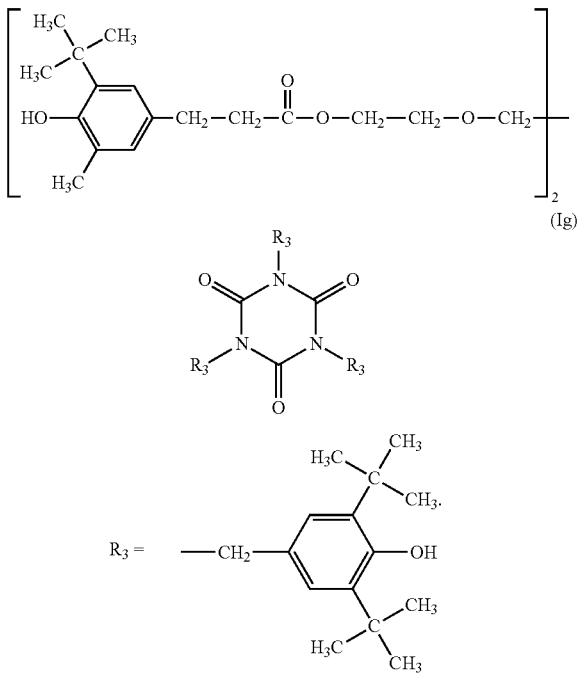

Preferably the phenolic antioxidant and/or processing stabilizer, component (C), is present in the composition in an amount of 0.01 to 5 wt %, preferably 0.02 to 2 wt %, 0.03 to 1 wt %, 0.05 to 0.5 wt % or 0.1 to 0.3 wt %, based on the total composition.

The composition of the invention may comprise as component (C) only the phenolic oxidant, only the processing stabilizer or both the phenolic oxidant and the processing stabilizer. When a phenolic antioxidant and a processing stabilizer are both present in the composition the above given amounts indicate the sum of both. Typically the weight ratio between phenolic antioxidant and processing stabilizer is from 1:10 to 10:1, preferably from 1:5 to 5:1.

Preferably, the phenolic antioxidant, component (C), is present in the composition in an amount of 0.01 to 5 wt %, preferably 0.02 to 2 wt %, 0.03 to 1 wt %, 0.05 to 0.5 wt % or 0.1 to 0.3 wt %, based on the total composition.

In a special embodiment, the invention relates to a process of the invention, wherein the surface-modified talc is prepared by mixing of a talc with a polar substance, preferably ethylene-bis-stearamide. This may be done off-line (i.e. prior to melt-mixing the heterophasic propylene copolymer with the talc and a phenolic antioxidant and/or a processing stabilizer) or the surface-modified talc may be prepared in situ (i.e. by adding the polar substance together with the talc in the melt-mixing step). Preferably, the preparation of the surface-modified talc is done in situ. This is made possible by the fact that a small amount of talc is used in the process according to the invention. This is advantageous in that the process is efficient and cost-effective. Accordingly, in some preferred embodiments of the invention, the surface-modified talc is added as a talc and a polar substance.

Without wishing to be bound be theory, it is believed that by mixing the talc with a polar substance, the talc can be 'coated' in situ.

Examples of the polar substances are as described herein. Preferably, the mixing of talc is done with ethylene-bis-stearamide (also referred to as EBS or EBA).

A peroxide may be added for the purpose of increasing the melt flow index of the composition of the present invention.

Preferably, the composition that is prepared by the process of the invention has a melt flow index in the range of 1 to 200 dg/min as measured according to ISO1133 (2.16 kg/230° C.). For example, the melt flow index is at least 1, for example at least 5 or for example at least 14 dg/min and/or for example at most 200 dg/min, for example at most 80 dg/min or for example at least 20 dg/min as measured according to ISO1133 (2.16 kg/230° C.). Preferably, the melt flow index of the composition that is prepared by the process of the invention is in the range from 5 to 80 dg/min, for example in the range from 14 to 20 dg/min as measured according to ISO1133 (2.16 kg/230° C.).

Examples of suitable peroxides include organic peroxides having a decomposition half-life of less than 1 minute at the average process temperature during the melt-mixing of the heterophasic propylene copolymer with the talc and the peroxide. Suitable organic peroxides include but are not limited to dialkyl peroxides, e.g. dicumyl peroxides, peroxyketals, peroxycarbonates, diacyl peroxides, peroxyesters and peroxydicarbonates. Specific examples of these include benzoyl peroxide, dichlorobenzoyl peroxide, dicumyl peroxide, di-tert-butyl peroxide, 2,5-dimethyl-2,5-di(peroxybenzoato)-3-hexene, 1,4-bis(tert-butylperoxyisopropyl)benzene, lauroyl peroxide, tert-butyl peracetate, α,α'-bis(tert-butylperoxy)diisopropylbenzene (Luperco® 802), 2,5-dimethyl-2,5-di(tert-butylperoxy)-3-hexene, 2,5-dimethyl-2,5-di(tert-butylperoxy)-hexane, tert-butyl perbenzoate, tert-butyl perphenylacetate, tert-butyl per-sec-octoate, tert-butyl perpivalate, cumyl perpivalate, cumene hydroperoxide, diisopropyl benzene hydroperoxide, 1,3-bis(t-butylperoxyisopropyl)benzene, dicumyl peroxide, tert-butylperoxy isopropyl carbonate and any combination thereof. Preferably, a dialkyl peroxides is employed in the process according to the present invention. More preferably, the peroxide is α,α'-bis-(tert-butylperoxy)diisopropylbenzene, 2,5-dimethyl-2,5-di(tert-butylperoxy)-hexane or 3,6,9-Triethyl-3,6,9-trimethyl-1,4,7-triperoxonane.

Preferably, the peroxide is selected from the group of non-aromatic peroxides.

It can easily be determined by the person skilled in the art through routine experimentation how much peroxide should be used to obtain a composition having the desired melt flow index. This also depends on the half-life of the peroxide and on the conditions used for the melt-mixing, which in turn depend on the exact composition of the heterophasic propylene copolymer.

Typically, the amount of peroxide used will lie in the range of 0.02 to 0.5 wt % based on the heterophasic propylene copolymer.

In another aspect, the invention relates to a composition obtained or obtainable by the process of the invention.

The invention provides a composition having a good thermooxidative stability. The thermooxidative stability of the composition can be measured e.g. by the time to embrittlement.

The time to embrittlement is defined as the time at which 5% of the total surface of 24 injection molded samples each having a dimension of 65*12.7*3.2 mm is discoloured after subjecting the samples to an oven aging at 150° C. under an air flow. For the avoidance of doubt, the total surface means the surfaces on all six sides of the 24 samples. During the degradation the injection moulded polymer samples discolour/degrade heterogeneously and subsequently become brittle. The skilled person is aware of how to determine the occurrence of discolouring and the area of the discoloured portions. The occurrence of discolouring is determined by the visual inspection of the samples. The area of the discoloured portions of the samples are added to determine whether it has reached 5% of the total area of the surfaces of the samples.

The composition according to the invention preferably has a time to embrittlement of at least 500 hours, more preferably at least 600 hours, more preferably at least 700 hours, more preferably at least 800 hours, more preferably at least 850 hours.

Accordingly, the invention provides a composition comprising a heterophasic propylene copolymer and talc, wherein the heterophasic propylene copolymer consists of
(a) a propylene-based matrix, wherein the propylene-based matrix consists of a propylene homopolymer and/or a propylene-α-olefin copolymer consisting of at least 70 wt % of propylene and up to 30 wt % of α-olefin, for example ethylene, based on the total weight of the propylene-based matrix, and wherein the propylene-based matrix is present in an amount of 60 to 95 wt % based on the total heterophasic propylene copolymer, and
(b) a dispersed ethylene-α-olefin copolymer, wherein the dispersed ethylene-α-olefin copolymer is present in an amount of 40 to 5 wt % based on the total heterophasic propylene copolymer and wherein the sum of the total amount of propylene-based matrix and total amount of the dispersed ethylene-α-olefin copolymer in the heterophasic propylene copolymer is 100 wt %, and wherein at least part of the talc is surface-modified and wherein the amount of talc in the composition is from about 0.5 to at most 5 wt % based on the heterophasic propylene copolymer,
wherein the composition has a time to embrittlement of at least 500 hours, wherein the time to embrittlement is the time at which 5% of the total surface of 24 injection molded samples of the composition each having a dimension of 65*12.7*3.2 mm is discoloured after subjecting the sample to an oven aging at 150° C. under an air flow.

In another embodiment, the invention relates to a composition comprising a low amount of a phenolic antioxidant and its degradation products. The phenolic antioxidant may be the phenolic antioxidant mentioned for component (C). For example, the phenolic antioxidant may be compound (Ic) and the degradation products may be the compound (Ic) from which one or more t-butyl groups are removed and a partly hydrolyzed product of compound (Ic). The degradation products of phenolic antioxidants are known to the skilled person and described e.g. in Polymer Degradation and Stability 95 (2010) 740-745.

Preferably, the amount of the phenolic antioxidant and its degradation products is less than 100 ppm, more preferably less than 75 ppm and more preferably less than 50 ppm based on the total composition. The low amount of phenolic antioxidant and its degradation products is favourable for organoleptic performance and lower emission levels.

For the determination of the amount of the phenolic antioxidant and its degradation products, a Soxhlet extraction may be performed on the composition according to the invention for 48 hours using chloroform as the extraction liquid. The amount of the phenolic antioxidant and its degradation products may be measured with LC-UV-MS (Liquid chromatography-ultraviolet-mass spectrometry) and LC-DAD/QTOF.

Accordingly, the invention provides a composition comprising a heterophasic propylene copolymer and talc, wherein the heterophasic propylene copolymer consists of
(a) a propylene-based matrix wherein the propylene-based matrix consists of a propylene homopolymer and/or a propylene-α-olefin copolymer consisting of at least 70 wt % of propylene and up to 30 wt % of α-olefin, for example ethylene, based on the total weight of the propylene-based matrix, wherein the propylene-based matrix is present in an amount of 60 to 95 wt % based on the total heterophasic propylene copolymer, and
(b) a dispersed ethylene-α-olefin copolymer, wherein the dispersed ethylene-α-olefin copolymer is present in an amount of 40 to 5 wt % based on the total heterophasic propylene copolymer and wherein the sum of the total amount of propylene-based matrix and total amount of the dispersed ethylene-α-olefin copolymer in the heterophasic propylene copolymer is 100 wt %, and wherein at least part of the talc is surface-modified and wherein the amount of talc in the composition is from about 0.5 to at most 5 wt % based on the heterophasic propylene copolymer, and
wherein the composition comprises a phenolic antioxidant and its degradation products at an amount of less than 100 ppm based on the total composition.

The amount of the phenolic antioxidant and its degradation products may be measured with LC-UV-MS and LC-DAD/QTOF on extracts of a Soxhlet extraction performed on the composition according to the invention for 48 hours using chloroform as the extraction liquid.

The degradation products may be the compound (Ic) from which one or more t-butyl groups are removed.

In a particularly preferred embodiment, the invention relates to a composition comprising a heterophasic propylene copolymer and talc, wherein the heterophasic propylene copolymer consists of
(a) a propylene-based matrix, wherein the propylene-based matrix consists of a propylene homopolymer and/or a propylene-α-olefin copolymer consisting of at least 70 wt % of propylene and up to 30 wt % of α-olefin, for example ethylene, based on the total weight of the propylene-based matrix, and wherein the propylene-based matrix is present in an amount of 60 to 95 wt % based on the total heterophasic propylene copolymer, and
(b) a dispersed ethylene-α-olefin copolymer, wherein the dispersed ethylene-α-olefin copolymer is present in an amount of 40 to 5 wt % based on the total heterophasic propylene copolymer and wherein the sum of the total amount of propylene-based matrix and total amount of the dispersed ethylene-α-olefin copolymer in the heterophasic propylene copolymer is 100 wt %, and
wherein at least part of the talc is surface-modified and wherein the amount of talc in the composition is from about 0.5 to at most 5 wt % based on the heterophasic propylene copolymer,
wherein the composition has a time to embrittlement of at least 500 hours, wherein the time to embrittlement is the time at which 5% of the total surface of 24 injection molded samples of the composition each having a dimension of 65*12.7*3.2 mm is discoloured after subjecting the sample to an oven aging at 150° C. under an air flow, and
wherein the composition comprises a phenolic antioxidant and its degradation products at an amount of less than 100 ppm based on the total composition.

Preferably, the composition according to the invention has a flexural modulus of at least 1400 MPa as determined according to ASTM D790-10, more preferably at least 1500 MPa, more preferably at least 1600 MPa and more preferably at least 1700 MPa. The composition according to the invention advantageously combines a good flexural modulus with a good thermooxidative stability and/or a low level of degradation products which may affect organoleptic performance and emission levels.

The compositions of the invention may further comprise additives. For example, the compositions may further contain nucleating agents, clarifiers, release agents, pigments, dyes, plasticizers, anti-oxidants, antistatics, scratch resistance agents, high performance fillers, impact modifiers, flame retardants, blowing agents, recycling additives, coupling agents, anti microbials, anti-fogging additives, slip additives, anti-blocking additives, polymer processing aids such as lubricants and the like, etc., surface tension modifiers, co-agents, for example 1,4-butanediol dimethacrylate (BDDMA), acrylate or methacrylate; components that enhance interfacial bonding between the polymer and the talc, for example maleated polypropylene etc. Such additives are well known in the art. The skilled person can readily select any suitable combination of additives and additive amounts without undue experimentation.

The amount of additives depends on their type and function. Typically, their amounts will be from 0 to 30 wt %, for example from 0 to 20 wt %, for example from 0 to 10 wt % or from 0 to 5 wt % based on the total composition.

The sum of all components added in the process of the invention to form the composition comprising a heterophasic propylene copolymer and talc should add up to 100% by weight. Preferably, the total of components (A), (B) and (C) is at least 70 wt %, at least 80 wt %, at least 90 wt %, at least 95 wt %, at least 97 wt %, at least 98 wt %, at least 99 wt %, at least 99.5 wt %, at least 99.9 wt % or 100 wt % of the total composition.

Some or all of the components may be pre-mixed with the heterophasic polypropylene, prior to melt-mixing the heterophasic polypropylene with the talc or they may be added to the melt-mixing step a). In case melt-mixing occurs in the extruder, the components may be added in any order and by any conventional means, for example at the same or different sites of the extruder.

In another aspect, the invention relates to the use of the compositions of the invention in injection moulding, blow moulding, extrusion moulding, compression moulding, thin-walled injection moulding, etc, for example in food contact applications.

In yet another aspect, the invention relates to a shaped article comprising the composition of the invention.

The composition of the invention may be transformed into shaped (semi)-finished articles using a variety of processing techniques. Examples of suitable processing techniques include injection moulding, injection compression moulding, thin wall injection moulding, extrusion, and extrusion compression moulding. Injection moulding is widely used to produce articles such as for example caps and closures, batteries, pails, containers, automotive exterior parts like bumpers, automotive interior parts like instrument panels, or automotive parts under the bonnet. Extrusion is for example widely used to produce articles, such as rods, sheets, films and pipes. Thin wall injection moulding may for example be used to make thin wall packaging.

Although the invention has been described in detail for purposes of illustration, it is understood that such detail is solely for that purpose and variations can be made therein by those skilled in the art without departing from the spirit and scope of the invention as defined in the claims.

It is further noted that the invention relates to all possible combinations of features described herein, preferred in particular are those combinations of features that are present in the claims.

It is further noted that the term 'comprising' does not exclude the presence of other elements. However, it is also to be understood that a description on a product comprising certain components also discloses a product consisting of these components. Similarly, it is also to be understood that a description on a process comprising certain steps also discloses a process consisting of these steps.

The invention is now elucidated by way of the following examples, without however being limited thereto.

EXAMPLES

Measurement Methods

For purpose of the present invention, embrittlement times of the samples (65*12,7*3.2 mm) during oven ageing at 150° C. were determined by visual evaluation with as degradation criterium the time until 5% of the sample surface was discoloured. This time was defined as brittle point.

For purpose of the present invention, phenolic antioxidants and their degradation products were separated from the polymer composition by means of a Soxhlet extraction, during 48 hours with chloroform as extraction liquid. Stabilizers were quantified and identified with LC-UV-MS and LC-DAD/QTOF. By using this technique the sample was chromatographically separated and UV and exact masses (positive and negative mode) were recorded. Based on the exact masses and isotope ratios the elemental compositions of peaks, showing a significant UV response as expected for phenolic additives, were determined. Based on the elemental composition structure proposals were made.

For purpose of the present invention, stiffness is determined by measuring the flexural modulus according to ASTM D790-10. Flexural modulus was determined on 3.2 mm thick specimens according to ISO37/2, perpendicular orientation.

For purpose of the present invention, impact strength is determined by measuring the Izod impact strength at 23° C. according to ISO 180 4A, Test geometry: 65*12.7*3.2 mm, notch 45° according to ISO 37/2 perpendicular orientation.

For purpose of the present invention, flow is determined by measuring the melt flow rate, also called melt flow index or melt index according to ISO1133 (2.16 kg/230° C.).

Method

Several samples were prepared using a starting material having a melt flow index (MFI) of 5.3. This material is a propylene heterophasic copolymer having a propylene polymer matrix wherein the propylene-based matrix (in this case a propylene homopolymer) is present in an amount of 84 wt % based on the total heterophasic propylene copolymer and 16 wt % of an ethylene-propylene copolymer consisting of 58 wt % of ethylene.

The heterophasic propylene copolymer (8.0-8.4 kg) was extruded in a twin screw ZE21 extruder with 50 000 ppm talcum. The formulation of these materials contained in addition 500 ppm of the processing aid calcium stearate and different amounts of the stabilizer Irganox B225 (1:1 Irganox 1010 (phenolic antioxidant) and Irgafos 168 (processing stabilizer)). The talcum, calcium stearate and Irganox B225 were mixed with the heterophasic copolymer prior to dosing it to the hopper of the extruder. The sum of the heterophasic propylene copolymer, talcum, calcium stearate and the stabilizer is 100%.

The temperature profile in the extruder was 20-20-30-50-100-170-220-220-240° C., at a throughput of 2.5 kg/h at 300 rpm.

The compositions differed on talcum type and concentration of stabilizers used. Different talcum types were Steamic OOS D G (surface coated talcum 1), Steamic T1DF (surface coated talcum 2) and Steamic T1CF, which is the uncoated equivalent of Steamic T1DF. All talcs were purchased from Imerys Luzenac.

Example 1

Determination of time to embrittlement (hours) of compositions with different talcs.

The ability to withstand thermooxidative stress in applications for a sufficient long time is traditionally determined using oven ageing. A forced air circulation oven for thermal (artificial) ageing provided by Vötsch Industrietechnik, more specifically Model NTU 60/60 and provided with a calibrated air flow meter (150 air changes per hour) was used. Twenty-four injection molded bars (65*12.7*3.2 mm) per formulation were aged at 150° C. During the degradation the injection moulded polymer samples discolour/degrade heterogeneously and subsequently become brittle. As degradation criterium the time until 5% of the total sample surface of 24 samples is discoloured/degraded was used. This time is defined as brittle point.

TABLE 1

Embrittlement times for talcum filled polymer compositions

| Sample # | Talcum type | Irganox B225 concentration (wt %) | Time to embrittlement (hours) |
| --- | --- | --- | --- |
| 1 | no talcum | 0.2 | 901 |
| 2 | coated talcum 1 | 0.2 | 949 |
| 3 | coated talcum 2 | 0.2 | 901 |
| A | uncoated talcum | 0.2 | 459 |

Conclusion 1

As can be seen from the results in table 1, the embrittlement time that is observed during long term heat stability testing is considerably lower for comparative sample A, than for the compositions of the invention (which use a coated talc) wherein the embrittlement time is comparable to the situation where no talcum is used.

Example 2

Determination of stabilizer concentration of talc filled compositions achieving embrittlement times of non talcum filled compositions Table 2 shows the stabilizer concentration needed in talcum filled compositions to obtain an identical embrittlement time as defined for non talcum filled compositions.

TABLE 2

Embrittlement times for talcum and non-talcum filled polymer compositions

| Sample # | Talcum type | Irganox B225 concentration (wt %) | Time to embrittlement (hours) |
| --- | --- | --- | --- |
| 1 | no talcum | 0.2 | 901 |
| 2 | coated talcum 1 | 0.2 | 949 |

TABLE 2-continued

Embrittlement times for talcum and non-talcum filled polymer compositions

| Sample # | Talcum type | Irganox B225 concentration (wt %) | Time to embrittlement (hours) |
| --- | --- | --- | --- |
| 3 | coated talcum 2 | 0.2 | 901 |
| A | uncoated talcum | 0.2 | 459 |
| B | uncoated talcum | 0.4 | 901 |

Conclusion 2

As can be seen from the results in table 2, the stabilizer concentration that is needed for equalling long term heat stability of non talcum filled compositions is considerably higher for comparative sample B, than for the compositions of the invention (which use a coated talc).

Example 3

Determination of the amount of phenolic antioxidant degradation products

The amount of the phenolic antioxidant and its degradation products of the compositions was also determined in the using the method described above. The results are presented in table 4 below.

TABLE 3

Amount of phenolic degradation products

| Sample # | Talcum type | Irganox 1010 [mg/kg] | Irganox 1010 and its degradation products after ageing [mg/kg] |
| --- | --- | --- | --- |
| 1 | no talcum | 1000 | <10 |
| 2 | coated talcum 1 | 1000 | 20 |
| 3 | coated talcum 2 | 1000 | <10 |
| A | uncoated talcum | 1000 | 430 |

Conclusion 3

As can be seen from table 3, the amount of the phenolic antioxidant and its degradation products after the processing step in the compositions of the invention is considerably lower than in the composition of comparative sample A. It is thought that a lower amount of the phenolic antioxidant and its degradation products is favourable for organoleptic performance and lower emission levels.

Example 4

Determination of time to embrittlement (hours) during oven ageing of talc filled compositions with increased stabilizer concentrations.

TABLE 4

Embrittlement times for talcum filled polymer compositions

| Sample # | Talcum type | Irganox B225 concentration (wt %) | Time to embrittlement (hours) |
| --- | --- | --- | --- |
| 4 | coated talcum 1 | 0.4 | 1539 |
| 5 | coated talcum 2 | 0.4 | 1470 |
| B | uncoated talcum | 0.4 | 901 |

Conclusion 4

As can be seen from the results in table 4, even in the case that all stabilizer packages have been increased, the embrittlement time that is observed during long term heat stability testing is considerably lower for comparative sample B, than for the compositions of the invention (which use a coated talc). Same trend as observed in example 1.

Example 5

Determination of the mechanical properties.

The Izod impact and the flexural modulus at 23° C. were also measured. The results are presented in table 5.

TABLE 5

Izod impact and flexural modulus of the heterophasic propylene copolymer composition having an MFI of 6.2 dg/min, using different talcs.

| Sample # | Talcum type | Irganox B225 concentration (wt %) | Impact (kJ/m$^2$) | Modulus (MPa) |
|---|---|---|---|---|
| 1 | no talcum | 0.2 | 9.9 | 1344 |
| 2 | coated talcum 1 | 0.2 | 9.7 | 1764 |
| 3 | coated talcum 2 | 0.2 | 9.6 | 1742 |
| A | uncoated talcum | 0.2 | 9.7 | 1777 |

Conclusion 5

As can be seen from the results in table 5, even though coated talcs were used in the compositions of the invention compared to the use of uncoated talcum in comparative sample A, the Izod impact and flexural modulus remain the same.

This shows that the mechanical properties of the composition of the invention even though containing a surface treated talcum type remain comparable to those of the comparable composition containing non coated talcum.

The invention claimed is:

1. A process for the preparation of a composition comprising (A) a heterophasic propylene copolymer, (B) talc and (C) a processing stabilizer, wherein the heterophasic propylene copolymer consists of
    (a) a propylene-based matrix, wherein the propylene-based matrix consists of a propylene homopolymer and/or a propylene-α-olefin copolymer consisting of at least 70 wt % of propylene and up to 30 wt % of ethylene, based on the total weight of the propylene-based matrix, wherein the propylene-based matrix is present in an amount of 60 to 95 wt % based on the total heterophasic propylene copolymer, and
    (b) a dispersed ethylene-α-olefin copolymer, wherein the dispersed ethylene-α-olefin copolymer is present in an amount of 40 to 5 wt % based on the total heterophasic propylene copolymer and wherein the sum of the total amount of propylene-based matrix and total amount of the dispersed ethylene-α-olefin copolymer in the heterophasic propylene copolymer is 100 wt %,
    wherein at least part of the talc is surface-modified and wherein the amount of talc in the composition is from about 0.5 to at most 5 wt % based on the heterophasic propylene copolymer, comprising the step of melt-mixing component (A), component (B) and component (C),
    wherein the α-olefin in the propylene-α-olefin copolymer is selected from the group of α-olefins having 2 or 4-10 carbon atoms,
    wherein the amount of ethylene in the ethylene-α-olefin copolymer is in the range of 20-65 wt %,
    wherein the α-olefin in the ethylene-α-olefin copolymer is chosen from the group of α-olefins having 3 to 8 carbon atoms and any mixtures thereof,
    wherein the processing stabilizer is selected from organic phosphites or phosphonites,
    wherein the surface-modified talc is a talc that is surface-modified with a polar substance selected from the group of glycols, silanes and amines, and
    wherein at least 80 wt % of the talc in the composition is surface modified.

2. The process according to claim 1, wherein the amount of component (C) is 0.01 to 5 wt %, based on the total composition.

3. The process according to claim 1, wherein the propylene-based matrix consists of a propylene homopolymer.

4. The process according to claim 1, wherein all talc used in the process is surface-modified.

5. The process according to claim 1, wherein (D) peroxide is further melt-mixed in step a).

6. The process according to claim 1, wherein the α-olefin in the ethylene-α-olefin copolymer is propylene.

7. The process according to claim 5, wherein the peroxide is α,α'-bis-(tert-butylperoxy)diisopropylbenzene, 2,5-dimethyl-2,5-di(tert-butylperoxy)-hexane or 3,6,9-Triethyl-3,6,9-trimethyl-1,4,7-triperoxonane.

8. The process according to claim 2, wherein the amount of component (C) is 0.02 to 2 wt %, based on the total composition.

9. The process according to claim 8, wherein the amount of component (C) is 0.03 to 1 wt %, based on the total composition.

10. The process according to claim 9, wherein the amount of component (C) is 0.05 to 0.5 wt %, based on the total composition.

11. The process according to claim 1, wherein the polar substance is an amine.

12. The process according to claim 1, wherein the propylene-based matrix consists of the propylene-α-olefin copolymer, or consists of a propylene homopolymer and the propylene-α-olefin copolymer.

13. A process for the preparation of a composition comprising (A) a heterophasic propylene copolymer, (B) talc and (C) a processing stabilizer, wherein the heterophasic propylene copolymer consists of
    (a) a propylene-based matrix, wherein the propylene-based matrix consists of a propylene homopolymer and/or a propylene-α-olefin copolymer consisting of at least 70 wt % of propylene and up to 30 wt % of ethylene, based on the total weight of the propylene-based matrix, wherein the propylene-based matrix is present in an amount of 60 to 95 wt % based on the total heterophasic propylene copolymer, and
    (b) a dispersed ethylene-α-olefin copolymer, wherein the dispersed ethylene-α-olefin copolymer is present in an amount of 40 to 5 wt % based on the total heterophasic propylene copolymer and wherein the sum of the total amount of propylene-based matrix and total amount of the dispersed ethylene-α-olefin copolymer in the heterophasic propylene copolymer is 100 wt %,
    wherein at least part of the talc is surface-modified and wherein the amount of talc in the composition is from about 0.5 to at most 5 wt % based on the heterophasic propylene copolymer, comprising the step of melt-mixing component (A), component (B) and component (C), wherein the α-olefin in the propylene-α-olefin copolymer is selected from the group of α-olefins having 2 or 4-10 carbon atoms, wherein the amount of ethylene in the ethylene-α-olefin copolymer is in the range of 20-65 wt %, wherein the α-olefin in the ethylene-α-olefin copolymer is chosen from the group of α-olefins having 3 to 8 carbon atoms and any mixtures thereof, wherein the processing stabilizer is selected from organic phosphites or phosphonites, wherein the surface-modified talc is a talc that is surface-modified with ethylene-bis-stearamide; and wherein at least 80 wt % of the talc in the composition is surface modified.

* * * * *